United States Patent [19]

Kageyama et al.

[11] Patent Number: 5,255,080
[45] Date of Patent: Oct. 19, 1993

[54] CONTRAST CORRECTOR FOR VIDEO SIGNAL

[75] Inventors: Atsushisa Kageyama; Hazama Yasue, both of Ibaraki, Japan

[73] Assignee: Matsushita Electric Industrial Co., Ltd., Osaka, Japan

[21] Appl. No.: 727,969

[22] Filed: Jul. 10, 1991

[30] Foreign Application Priority Data

Jul. 17, 1990 [JP] Japan ................ 2-187294

[51] Int. Cl.⁵ ............... H04N 9/77; H04N 9/64; H04N 9/69; H04N 5/57
[52] U.S. Cl. ....................... 358/39; 358/40; 358/32; 358/34; 358/169
[58] Field of Search ............ 358/39, 40, 32, 34, 358/169, 243, 37, 166, 21 R, 27

[56] References Cited

U.S. PATENT DOCUMENTS

| | | | |
|---|---|---|---|
| 3,804,981 | 4/1974 | Avins | 358/169 |
| 3,928,867 | 12/1975 | Lynch | 358/169 |
| 4,038,685 | 7/1977 | Bazin | 358/32 |
| 4,811,101 | 3/1989 | Yagi | 359/34 |
| 4,831,434 | 5/1989 | Fuchsberger | 358/40 |
| 5,003,394 | 3/1991 | Lagoni | 358/169 |
| 5,068,718 | 11/1991 | Iwabe et al. | 358/39 |

FOREIGN PATENT DOCUMENTS 3809303 10/1989 Fed. Rep. of Germany.

Primary Examiner—John K. Peng
Assistant Examiner—John W. Miller
Attorney, Agent, or Firm—Stevens, Davis, Miller & Mosher

[57] ABSTRACT

For a video apparatus such as a television receiver, a gray level correcting device is provided to correct luminance and color saturation of a video signal, thereby making the reproduced image clear and vivid. In this device, at least one of the difference between the black level of the luminance signal and a predetermined pedestal voltage and the difference between the white level and a certain white level control voltage is calculated, and the color saturation of a chrominance signal is controlled by the color saturation control voltage added with the calculated difference.

4 Claims, 4 Drawing Sheets

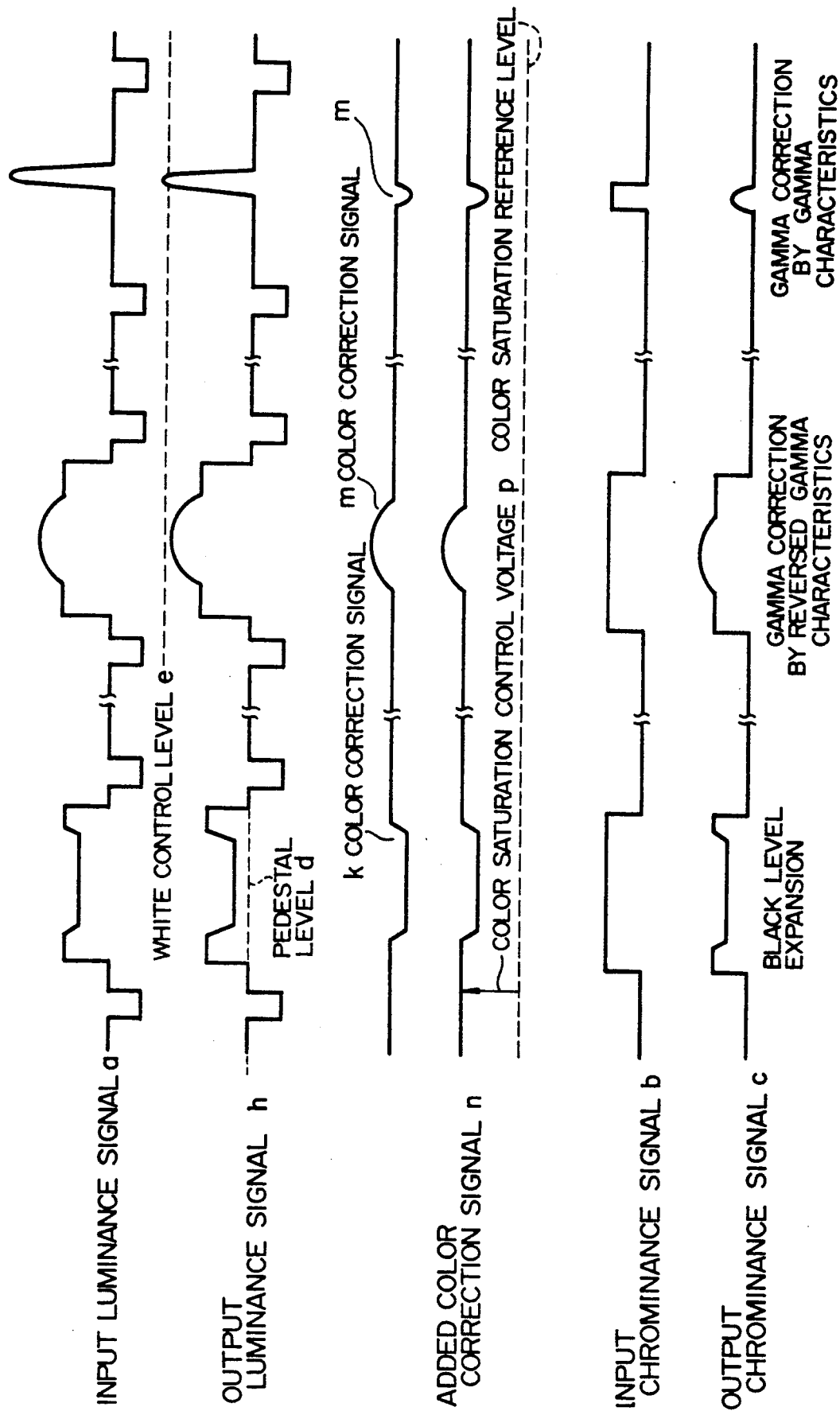

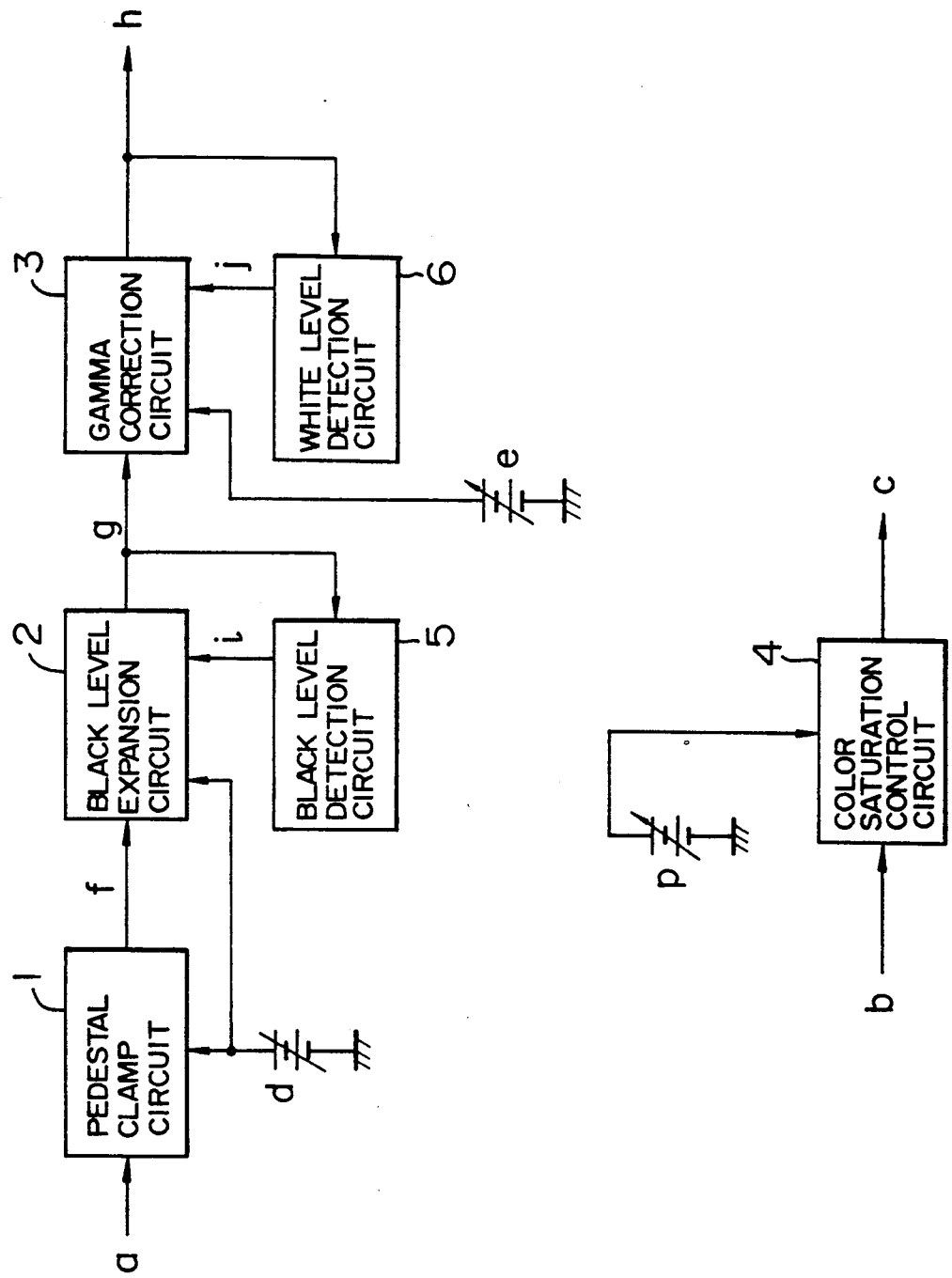

5,255,080

CONTRAST CORRECTOR FOR VIDEO SIGNAL

BACKGROUND OF THE INVENTION

This invention relates to video apparatus such as television receivers and video tape recorders, and particularly to a gray level correction device or contrast corrector for video signal which can correct the luminance and color saturation of a video signal so as to make the displayed image more clear and vivid.

Recently, as the large-screen type television receiver becomes popular, a gray level correction device such as the black level detection circuit and gamma correction circuit has often been used for the video luminance signal in order that the image may be seen clear and vivid.

FIG. 3 is a block diagram of a conventional gray level correction device for video signal. In FIG. 3, there are shown a pedestal clamp circuit 1 for clamping a video luminance signal input a to a pedestal level d, and a black level expansion circuit 2 for expanding the signal component level of a dark portion of a clamped luminance signal f in the pedestal level direction when a detected black level i is compared with the pedestal level d and as a result, higher (brighter) than the pedestal level d. In addition, shown at 3 is a gamma correction circuit which corrects the luminance in accordance with the characteristic shown in FIG. 4. That is, the gamma correction circuit 3 compares a detected white level j and a white level control voltage e, and when the detected white level j is not higher than the white level control voltage e, it exhibits the luminance conversion characteristics (reversed gamma characteristics) as shown in FIG. 4A to a clamped luminance signal g with expanded black level, thus correcting it to expand the luminance of the bright portion. When the detected white level j is higher than the white level control voltage e, the gamma correction circuit 3 exhibits the luminance conversion characteristics (gamma characteristics) as shown in FIG. 4B to the clamped luminance signal g with expanded black level, thus correcting it to suppress the luminance of the bright portion. Shown at 4 is a color saturation control circuit for controlling the saturation of a chrominance signal input b in accordance with a color saturation control voltage p so as to produce a chrominance signal output C. This chrominance signal may be color carriers, color differences values or red, green, blue (RGB) video signals. Shown at 5 is a black level detection circuit for detecting the level of the darkest portion at each effective video signal period of the black expanded clamped luminance signal g. Shown at 6 is a white level detection circuit for detecting the level of the brightest portion within the effective video signal period of an output luminance signal h.

The operation of the above-mentioned gray level correction device for video signal will be described below.

First, when the luminance signal input a is supplied to the pedestal clamp circuit 1, this circuit clamps the pedestal of the luminance signal a to the pedestal voltage d, thus producing the clamped luminance signal f. This signal f is supplied to the black level expansion circuit 2. When the detected black level i is higher than the pedestal level d (brighter), the black level expansion circuit expands the luminance of the black portion of the clamped luminance signal f in the pedestal direction, thus producing the clamped luminance signal g with expanded black level. This signal g is supplied to the black level detection circuit 5, which then detects the black level of the effective luminance signal. Moreover, the signal g is also supplied to the gamma correction circuit 3, where the white level control voltage e and the detected white level j are compared and the gray correction is made, thus the corrected luminance signal h being produced. The corrected luminance signal h is also supplied to the white level detection circuit 6, which then detects the white level of the effective luminance signal. On the other hand, independently of the above correction of the luminance signal, the color saturation control circuit 4 receives the chrominance signal b and controls its color saturation in accordance with the color saturation control voltage p so as to produce a controlled chrominance signal c.

In the above arrangement, however, only the luminance signal is corrected for the black level and is gamma-corrected without any affection to the chrominance signal. Therefore, when the luminance signal is corrected for the gray level, the luminance and the chrominance signals of that portion are unbalanced with the result that the reproduced color is seen different from the original color.

SUMMARY OF THE INVENTION

Accordingly, to solve the problems in the prior art, it is an object of the invention to provide a gray level correction device for video signal which changes the saturation of the chrominance signal when the luminance signal is corrected for the gray level, thereby making the color of the image more clear and vivid.

In order to achieve the above object, the gray level correction device or contrast corrector for video signal according to this invention comprises, in addition to the constitution of the prior art, a first subtractor circuit for calculating the difference between the black level and the pedestal level, a second subtractor circuit for calculating the difference between the white level and the white control level and an adder circuit for adding the outputs of both subtractor circuits and the color saturation control voltage p.

According to the construction of the invention, the first subtractor circuit detects the amount of the black level expansion, and the second subtractor circuit detects the amount of correction in the gamma correction circuit. These amounts and the color saturation control voltage are added by the adder circuit. The color saturation is changed in accordance with each amount of correction, so that the color of the image can be reproduced with higher fidelity. Thus, it is possible to solve the problem that the reproduced luminance and color components are unbalanced to lose the original color.

BRIEF DESCRIPTION OF THE DRAWINGS

FIG. 2 is a waveform diagram for explaining the operation of the device shown in FIG. 1.

FIG. 3 is a block diagram of a conventional gray level correction device for video signal.

DESCRIPTION OF THE PREFERRED EMBODIMENTS

A gray level correction device or contrast corrector for video signal of one embodiment of the invention will be described with reference to the drawings.

Figure 1:
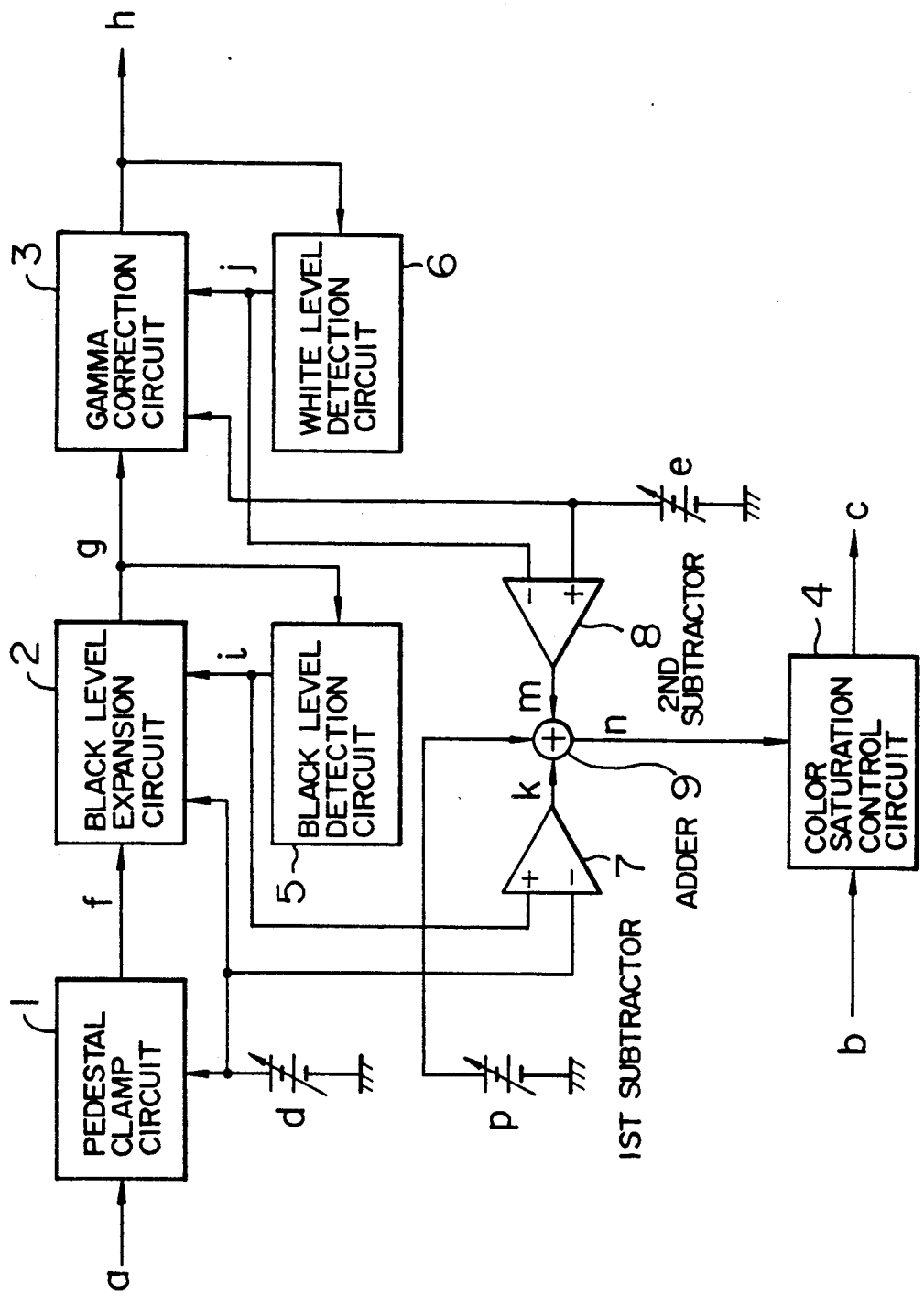
FIG. 1 is a block diagram of a gray level correction device for video signal in one embodiment of the invention.

FIG. 1 is a block diagram of a contrast corrector for video signal of one embodiment of the invention. Referring to FIG. 1, there are shown the pedestal clamp circuit 1, the black level expansion circuit 2, the gamma correction circuit 3, the color saturation control circuit 4, the black level detection circuit 5 and the white level detection circuit 6 as in the prior art. Shown at 7 is a first subtractor circuit for subtracting the pedestal voltage d from the detected black level i and producing a color correction signal k obtained from the resulted difference voltage. Shown at 8 is a second subtractor circuit for subtracting the white level control voltage e from the detected white level j and producing a color correction signal m obtained from the resulted difference voltage. Shown at 9 is an adder circuit for adding the color saturation control voltage p, the color correction signals k and m and producing an added color correction signal n as a result of the addition.

Figure 4A:
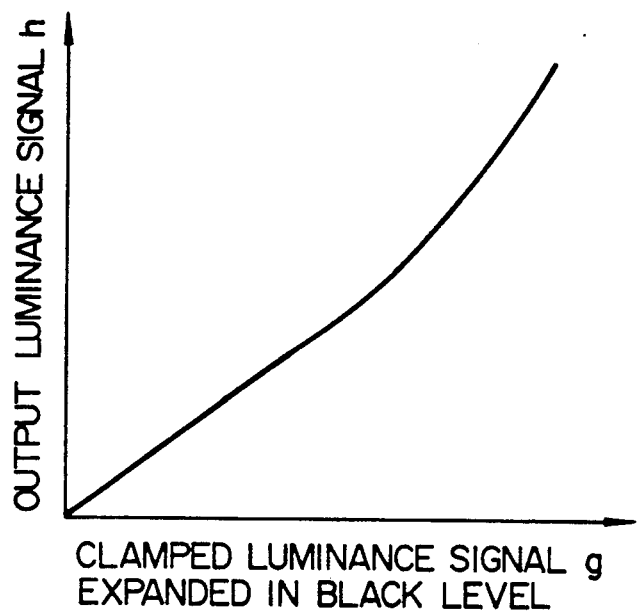
FIGS. 4A and 4B are graphs showing the characteristics of the gamma correction circuit.
Figure 4B:
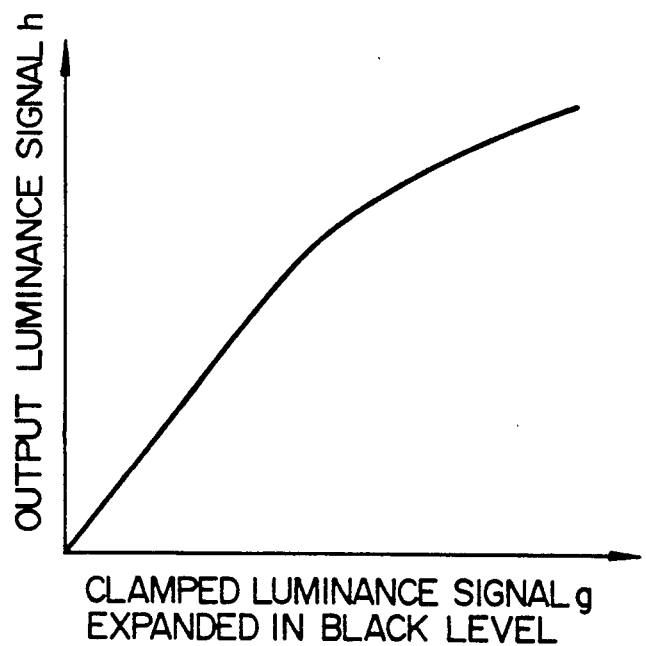

FIG. 2 is a waveform diagram for explaining the operation of the construction shown in FIG. 1. In FIG. 2, waveforms in case of a black level expansion are shown on the left hand side, a gamma correction according to the reversed gamma characteristics on the central portion, and the gamma correction according to the gamma characteristics on the right hand side. In operation, the input luminance signal a undergoes the black level expansion and the gamma correction as in the prior art, and as a result the processed luminance signal h is produced. The first subtractor circuit 7 makes subtraction between the detected black level i and the pedestal voltage d, and produces the color correction signal k corresponding to the amount of black level expansion of the luminance signal. As shown in FIG. 2, this color correction signal k acts to reduce the color saturation as the black level expansion amount increases. In addition, the second subtractor circuit 8 makes subtraction between the detected white level j and the white level control voltage e, and produces the color correction signal m corresponding to the amount of gamma correction on the luminance signal. As shown in FIG. 2, this color correction signal m acts to relatively increase the color saturation when the gamma characteristic is such that the output luminance signal h is relatively high in higher range of the black level expanded luminance signal g as shown in FIG. 4A, and to relatively decrease the color saturation when the gamma characteristic is such that the luminance signal h is relatively low in higher range of the black level expanded luminance signal g as shown in FIG. 4B. The color correction signals k and m obtained as above are added to the color saturation control voltage p, thus the added color correction signal n being obtained. This added color correction signal n is supplied to the color saturation control circuit 4, controlling the color saturation of the input chrominance signal b so that the color saturation control circuit produces the output chrominance signal c. The obtained chrominance signal c is reduced in its saturation when the output luminance signal h is expanded in the black level. When the output luminance signal h is gamma-corrected as shown in FIG. 4A, the saturation of the chrominances signal is increased, but when it is corrected as in FIG. 4B, the color saturation is decreased.

Therefore, even when the luminance signal is corrected in its gray level, the luminance and chrominance of that portion can be balanced in response to the amount.

Thus, according to this embodiment, since the first and second subtractor circuits and the adder circuit are provided in addition to the constitution in the prior art, the saturation of the chrominance signal can be changed in accordance with the gray level correction of the luminance signal. therefore, the gray level correction device or contrast corrector for video signal is able to reproduce pictures with faithful color for human eyes.

While in FIG. 2 the color corrected signal is changed at any location in one horizontal line, the signal may be processed in a field unit or a frame unit.

We claim:

1. A gray level correction device for video signals including a chrominance signal and a luminance signal which has a pedestal level and a black level, said device comprising:

a pedestal clamp circuit for clamping said pedestal level of said luminance signal to a predetermined pedestal voltage;

a black level detection circuit for detecting said black level of said luminance signal;

a black level expansion circuit for expanding said black level to substantially said pedestal level of said luminance signal in accordance with said black level detected by said black level detection circuit and said predetermined pedestal voltage;

a subtractor circuit for calculating a difference between the detected black level and said pedestal voltage and outputting a color correction signal;

means for outputting a color saturation control voltage;

an adder circuit for adding said color correction signal to said color saturation control voltage and outputting a modified color saturation control signal; and a color saturation control circuit for suppressing color saturation of said chrominance signal in accordance with said modified color saturation control signal.

2. A gray level correction device for video signals including a chrominance signal and a luminance signal which has a pedestal level and a white level, said device comprising:

a pedestal clamp circuit for clamping said pedestal level of said luminance signal to a predetermined pedestal voltage;

a white level detection circuit for detecting said white level of the luminance signal;

a gamma correction circuit for gamma-correcting said luminance signal with a gamma coefficient selected according to said white level detected by said white level detection circuit and a predetermined white level control voltage;

a subtractor circuit for calculating a difference between the detected white level and said predetermined white level control voltage and outputting a color correction signal;

means for outputting a color saturation control voltage;

an adder circuit for adding said color correction signal to said color saturation control voltage and outputting a modified color saturation control signal; and a color saturation control circuit for controlling color saturation of said chrominance signal in accordance with said modified color saturation control signal.

3. A gray level correction device for video signals including a chrominance signal and a luminance signal which has pedestal level, a black level and a white level, said device comprising:

a pedestal clamp circuit for clamping said pedestal level of said luminance signal to a predetermined pedestal voltage;

a black level detection circuit for detecting said black level of said luminance signal;

a black level expansion circuit for expanding said black level to substantially said pedestal level of said luminance signal in accordance with said black level detected by said black level detection circuit and said predetermined pedestal voltage;

a white level detection circuit for detecting said white level of the luminance signal;

a gamma correction circuit for gamma-correcting said luminance signal with a gamma coefficient selected according to said white level detected by said white level detection circuit and a predetermined white level control voltage;

a first subtractor circuit for calculating a difference between said detected black level and said predetermined pedestal voltage and outputting a first color correction signal;

a second subtractor circuit for calculating a difference between the detected white level and said predetermined white level control voltage and outputting a second color correction signal;

means for outputting a color saturation control voltage;

an adder circuit for adding said first and second color correction signals to the said color saturation control voltage and providing a modified color saturation control signal; and a color saturation control circuit for controlling color saturation of said chrominance signal in accordance with said modified color saturation control signal.

4. A gray level correcting method for video signals including a luminance signal and a chrominance signal, comprising the steps of:

detecting black level of said luminance signal;

detecting a white level of said luminance signal;

calculating a first difference between the detected black level and a predetermined pedestal voltage to which a pedestal level of said luminance signal is to be clamped;

calculating a second difference between the detected white level and a predetermined white level control voltage which is a reference voltage for selecting a gamma coefficient for use in a gamma correction circuit;

calculating a sum of a color saturation voltage and said first and second calculated differences; and controlling color saturation of said chrominance signal in accordance with said calculated sum.

* * * * *

UNITED STATES PATENT AND TRADEMARK OFFICE
CERTIFICATE OF CORRECTION

PATENT NO. : 5,255,080

DATED : October 19, 1993

INVENTOR(S) : Atsuhisa Kageyama and Hazama Yasue

It is certified that error appears in the above-identified patent and that said Letters Patent is hereby corrected as shown below:

Cover Page, Item [75] Inventors: change first inventor's name

"Atsushisa Kageyama" to --Atsuhisa Kageyama--.

Signed and Sealed this

Twenty-fourth Day of May, 1994

Attest:

BRUCE LEHMAN

Attesting Officer

Commissioner of Patents and Trademarks